UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER AND THE PREPARATION THEREOF.

1,147,852.  Specification of Letters Patent.  Patented July 27, 1915.

No Drawing.  Application filed July 18, 1908. Serial No. 444,239.

*To all whom it may concern:*

Be it known that I, CARLETON ELLIS, a citizen of the United States, and resident of Larchmont, Westchester county, New York, have made certain new and useful Inventions Relating to Finish-Removers and Preparation thereof, of which the following is a specification.

This invention relates to removers and the preparation thereof, and relates especially to removers comprising carbon-tetrachlorid or other chlorinated solvents and prepared by the incorporation of suitable acetates in alcohol or other finish solvent material, thereby effecting esterification or condensation products, if desired, with the incorporation of suitable strong sulfuric or other acid material, the remaining ammonia or other acetate material neutralizing any acid tendency of the chlorinated solvents used.

Acetates, such as metallic acetates including potassium, ammonium, sodium, magnesium and barium acetates, are quite soluble in methyl, ethyl and other alcohols and in other allied loosening finish solvent materials (that is, solvents of a generally alcoholic character or action in removers) such as the allied ketonic solvents, including methyl ethyl ketone, methyl acetone (that is, a composition containing about 40% of acetone, some wood alcohol and the balance higher ketones) and acetone. The solution may be readily effected by heating the alcoholic or similar solvent body in a reflux condenser in contact with an excess of the desired acetate or other salt capable of effecting esterification, suitable amounts of acid material such as strong or anhydrous sulfuric or hydrochloric acid being incorporated if desired, the temperature being carried up to near the boiling point of the solvents used, or, if desired, the solution may take place in a digester preferably in the presence of an excess of the acetate, the pressure and temperature being carried up to any desired point to facilitate solution and the resulting esterification, although such increase of temperature is not always necessary to effect the desired conversion of the solvent material. Under such conditions the alcohol and strong acid which may be slowly added in amounts nearly sufficient to completely combine with the base of the acetate used react to form the corresponding metallic salt and acetic esters with the alcohol or other solvents employed, such acetic or similar esteric solvents materially adding to the finish softening and solvent action of the remover. Among other salts capable of effecting such esterification are other alcohol soluble salts preferably having organic acid radicals of the fatty or aromatic series, such as formates, propionates, butyrates, and so forth. An illustrative remover of this character may be formed by incorporating seven parts of calcined sodium acetate with nine parts of denatured alcohol and two parts of methyl ethyl ketone, four parts of strong sulfuric acid being slowly added so as to prevent the formation of ethers, the mixture being preferably stirred in a closed digester or mixer having agitating means therein which may be provided with a reflux condenser. The sulfuric acid added is nearly sufficient to neutralize the base of the acetate used so as to form a considerable amount of acetic esters of the alcoholic and ketonic solvents, thus materially increasing their finish softening and solvent properties. Eleven parts of carbon-tetrachlorid in which one part of paraffin or other waxy material may if desired be dissolved, may then be incorporated with the mixture and also four parts of crude terpineol or pine oil and one-half part of anhydrous ammonium acetate which may of course be prepared by allowing dry ammonia gas to percolate through glacial acetic acid. The particles of sodium sulfate formed are agglomerated with the colloidal waxy material and uniformly distributed by the continued agitation of the mixture so as to give a very desirable stiffening material throughout the body of the remover. The presence of ammonium acetate keeps the remover alkaline by the esteric action of such acetate material, thus having a valuable antacid action and effectually neutralizing any acid tendency of the chlorinated solvents, the ammonia vapors protecting the portion of the container above the liquid which is of course desirable. It is not necessary to add ammonium acetate to such mixtures since any free ammonium salt incorporated will give a similar result when in the presence of acetates of basic metals capable of displacing the ammonia radical and having such esteric action as has been indicated. Instead of the sodium acetate referred to an equivalent amount of potassium or other acetate may be used, it being understood that calcined or other anhydrous salts are desirable in such removers to avoid hydrolysis. Instead of the crude terpineol referred to other penetrating finish solvent material, that is, finish solvents having generally benzolic character or action in removers comprising benzol, toluol, xylol, naphtha, benzin and other petroleum hydrocarbons, as well as wood turpentine, turpentine and terpineol may be used to some extent at least, although the more volatile and inflammable should only be used in small proportion if the non-inflammable character of the remover is important. Other chlorinated finish solvent material, such as chlorinated acetylene for instance may also be used and may replace to some extent at least carbon-tetrachlorid in such removers as indicated.

Another illustrative remover may comprise nine parts of grain alcohol, one part of wood alcohol, eleven parts of carbon-tetrachlorid, one part of ammonium acetate, one to three parts of amyl acetate which may be added in considerable quantity to such removers without materially increasing their inflammability, two parts of carbolic acid and one part of wax. Another illustrative remover may comprise nine parts of denatured alcohol, one part of sodium acetate, one-half part of ammonium chlorid, five parts of carbon-tetrachlorid, five parts of cresylic acid, one part of wax, such as paraffin or ceresin, which may be conveniently dissolved in carbon-tetrachlorid. Another illustrative remover may comprise twelve parts of denatured alcohol, one part of amyl alcohol, eleven parts of carbon-tetrachlorid, five parts of wood tar oil, one part of kerosene and one part of ammonium acetate which may be replaced if desired by one part of sodium acetate and one part of ammonium chlorid or sulphate. Another illustrative remover may comprise eleven parts of denatured alcohol, one part of sodium acetate, one part of ammonium chlorid, nine parts of carbon-tetrachlorid with which one part of paraffin may be dissolved if desired.

The invention has been described in this case which contains subject-matter taken from United States patent application 420,808, filed March 13, 1908 in connection with a number of illustrative ingredients, formulas, proportions and methods of preparation, to the details of which the invention is not of course to be limited.

What is claimed is:

1. The non-inflammable finish remover formed by incorporating approximately seven parts of sodium acetate in nine parts of denatured alcohol and two parts of methyl ethyl ketone and slowly incorporating four parts of strong sulfuric acid producing condensation and incorporating eleven parts of carbon-tetrachlorid, four parts of crude terpineol, in which one part of paraffin and one-half part of ammonium acetate have been incorporated.

2. The substantially non-inflammable finish remover formed by incorporating approximately seven parts of a metallic acetate with nine parts of loosening finish solvent material including an alcohol and incorporating four parts of strong acid producing condensation and incorporating eleven parts of carbon-tetrachlorid, four parts of penetrating finish softening material and an ammonium salt capable of displacement by the base of the acetate incorporated.

3. The substantially non-inflammable finish remover formed by incorporating metallic acetate and a stronger acid than acetic acid in eleven parts of loosening finish softening material including an alcohol producing condensation and incorporating eleven parts of chlorinated finish softening material and an ammonium salt.

4. The substantially non-inflammable finish remover comprising a plurality of finish solvents including an alcoholic body and a chlorinated solvent in which an ammonium salt and an acetate of a more basic metal capable of displacing said ammonium salt have been incorporated.

5. The substantially non-inflammable finish remover comprising a plurality of finish solvents including an alcoholic body and a chlorinated solvent in which a metallic organic salt has been dissolved to effect esterification and thereby produce antacid material to neutralize any acid tendency of the chlorinated solvent.

6. The antacid substantially non-inflammable finish remover comprising composite finish softening material including a body having an acid tendency and dissolved ammonium salt and an incorporated salt of a metal capable of displacing said ammonium salt and capable of esterification in connection with said finish softening material.

7. The antacid finish remover comprising composite finish softening material and a dissolved ammonium salt capable of esterification with the finish softening material to develop ammonia.

8. The antacid finish remover comprising composite finish softening material having an acid tendency and an incorporated metallic salt capable of esterification with the finish softening material to develop alkalinity.

9. The antacid non-inflammable finish remover comprising composite finish softening material including a chlorinated solvent and a dissolved ammonium salt capable of esterification in connection with said finish softening material to develop free ammonia.

10. The process of making substantially non-inflammable finish remover which consists in incorporating a metallic acetate in a plurality of finish solvents including an alcoholic body, in incorporating a stronger acid than acetic acid and effecting condensation and in dissolving free ammonium acetate therein and incorporating penetrating finish solvent material including carbon-tetrachlorid.

11. The process of making substantially non-inflammable finish remover which consists in incorporating a metallic acetate and a stronger acid than acetic acid in finish softening material and effecting condensation, in dissolving an ammonium salt therein and in incorporating chlorinated finish solvent material therewith.

12. The process of making substantially non-inflammable finish remover which consists in incorporating a salt of a metal capable of displacing ammonium and an acid capable of displacing the acid radical of the metallic salt in finish solvent material and effecting condensation, in dissolving therein an ammonium salt and incorporating chlorinated finish softening material therewith.

13. The process of making antacid finish remover which consists in incorporating a salt of a basic metal capable of displacing ammonium and an acid capable of displacing the acid radical of the metallic salt in finish softening material and effecting condensation, and in incorporating an ammonium salt and finish softening material having an acid tendency.

14. The process of making antacid finish remover which consists in dissolving in composite finish softening material a salt of a metal capable of effecting esterification therewith, said metal being capable of displacing ammonium and in incorporating an ammonium salt therewith.

15. The process of making antacid finish remover which consists in incorporating with composite finish softening material including a chlorinated solvent, a salt of a basic metal capable of effecting esterification therewith, said basic metal being capable of displacing ammonium, and in incorporating an ammonium salt.

16. The process of making antacid substantially non-inflammable finish remover which consists in dissolving in composite finish softening material comprising carbontetrachlorid a metallic salt capable of esterification in connection with the finish softening material and having a base capable of neutralizing any acid tendency developed.

17. The process of making antacid substantially non-inflammable finish remover which consists in dissolving in composite finish softening material including a chlorinated solvent an ammonium salt capable of esterification in connection with the solvent material to thereby neutralize any acid tendency developed.

18. The process of making antacid finish remover consisting in incorporating in composite finish softening material having an acid tendency a metallic salt capable of esterification in connection with the finish softening material to thereby develop alkalinity.

19. The process of making antacid substantially non-inflammable finish remover which consists in incorporating in composite finish solvent material including an alcohol and an inflammability suppressing solvent having an acid tendency, a metallic salt capable of esterification in connection with the solvent material to thereby develop alkalinity.

20. The substantially non-inflammable finish remover comprising composite finish softening material including chlorinated finish solvent and incorporated salts of basic metals capable of esterification in connection with the finish softening material to thereby develop alkalinity.

CARLETON ELLIS.

Witnesses:
HARRY L. DUNCAN,
JESSIE B. RAY.